Oct. 27, 1931.  R. H. MILLER  1,829,104
INCLINATION RECORDING DEVICE
Filed Aug. 8, 1927   2 Sheets-Sheet 2
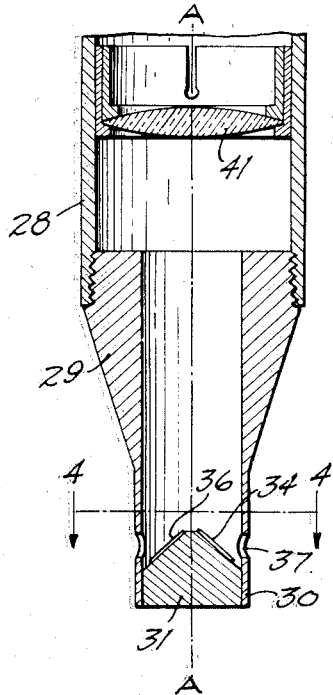
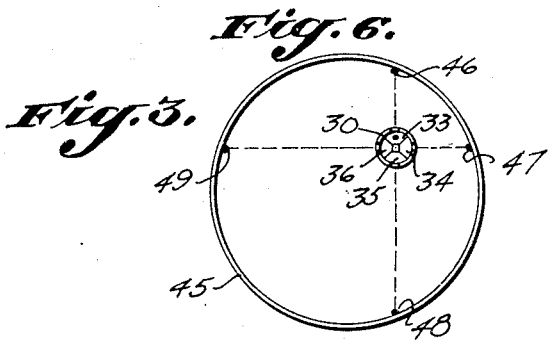
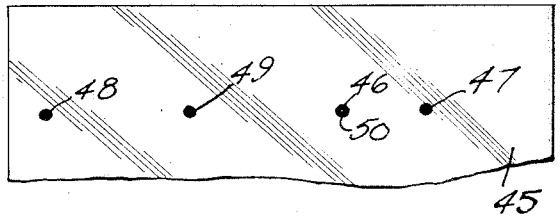
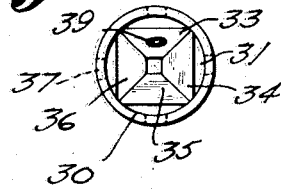
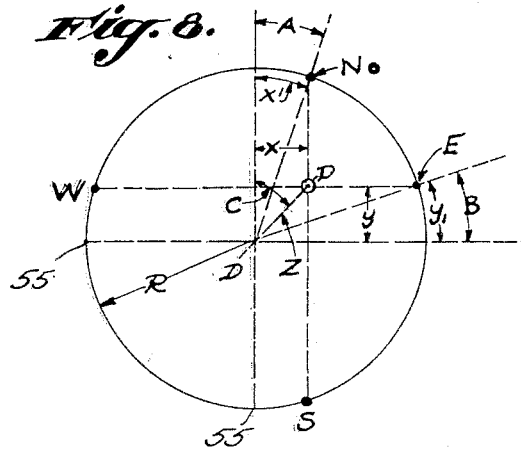
INVENTOR:
ROBERT H. MILLER
BY
ATTORNEY.

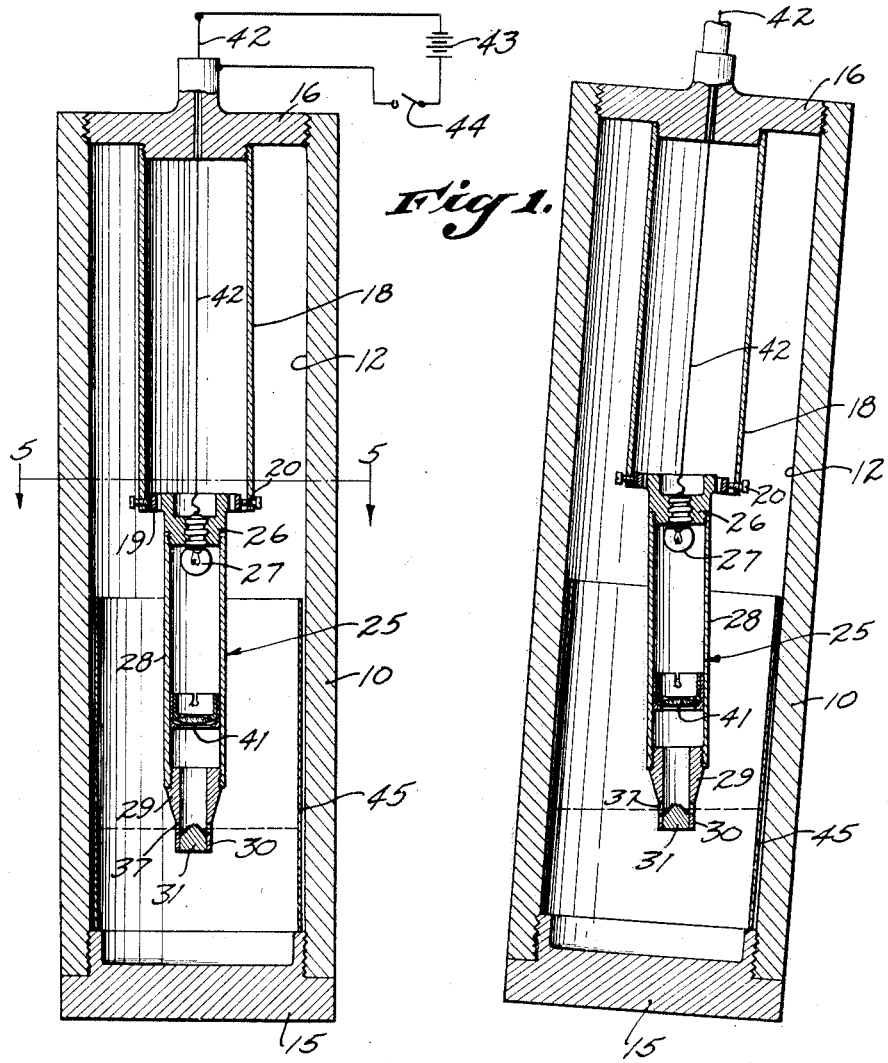

Patented Oct. 27, 1931

1,829,104

UNITED STATES PATENT OFFICE

ROBERT H. MILLER, OF LOS ANGELES, CALIFORNIA, ASSIGNOR TO SHELL OIL COMPANY, OF SAN FRANCISCO, CALIFORNIA, A CORPORATION OF CALIFORNIA

INCLINATION RECORDING DEVICE

Application filed August 8, 1927. Serial No. 211,416.

My invention relates to inclination recording devices and more particularly to a device for recording the amount and direction of deviations from the vertical.

It is often desirable to measure the direction and angle of slope of a surface which is inaccessible to the ordinary measuring devices. Such a condition is frequently met in the building and drilling arts and is often difficult of solution.

It is an object of my invention to provide a novel device which measures the angle of slope and the direction of slope of such a surface.

A further object of my invention is to provide a novel recording apparatus which records data on a sensitized film.

Further objects and advantages of my invention will be made apparent from the following description.

In the drawings, I illustrate one form of my invention. Other forms and applications will be evident to those skilled in various arts to which this invention may be adapted.

Fig. 1 diagrammatically shows the apparatus in a vertical position.

Fig. 2 shows the relative positions of the parts of the apparatus when tilted.

Fig. 3 is an enlarged view of the bottom of the pendulum of my invention.

Fig. 4 is a section taken on the line 4—4 of Fig. 3.

Fig. 5 is a section taken on the line 5—5 of Fig. 1.

Fig. 6 is a diagrammatic horizontal sectional view of the apparatus when tilted.

Fig. 7 is a view of the recording film when flattened out.

Fig. 8 is a sketch explaining the mathematical relations involved in the calculation of the desired angle.

Referring to the drawings in detail. Figs. 1 and 2 show a supporting structure in the form of a shell 10 having a cylindrical bore 12 therethrough. The bore 12 is closed at its lower end by a plug 15, and at its upper end by a cap 16.

Depending from the cap 16 is a tube 18 which is concentric with the bore 12. The lower end of the tube 18 supports a yoke 19 by pivots 20. Supported from the yoke 19 by pivots 22, as shown in Fig. 5, is a recording member in the form of a pendulum 25 of a recording instrument of the invention which is illustrated in Figs. 1, 2, 3, and 4. The pendulum 25 has an upper member 26 which is engaged by the pivots 22 and which supports an illumination source in the form of a lamp 27. Extending downward from the upper member 26 is a shell or housing 28 at the lower end of which a mirror supporting member 29 is attached. The mirror supporting member 29 is shown in detail in Figs. 3 and 4. The extreme lower end thereof is in the form of a tubular projection 30 which supports a block 31. This block 31 carries deflecting means in the form of mirrors, there being a north mirror 33, an east mirror 34, a south mirror 35, and a west mirror 36. These mirrors 33 to 36 inclusive are disposed on planes at forty-five degrees to the central axis A—A of the pendulum 25. The light passing parallel to the axis A—A will be reflected by the mirrors in a direction at right angles to this axis. Adjacent to each mirror is an opening 37 in the tubular projection 30 through which the reflected light rays may pass in the form of a beam, the size of the beam being a function of the size of the openings 37. The north mirror 33 is distinguished from the other mirrors by having a central opaque portion 39 which will not reflect light. Supported in the shell 28 below the light source 27 is a lens 41 which focuses the light rays from the light source.

The lamp 27 receives electrical energy through a wire 42 which passes through the cap 16 and connects to one terminal of a battery 43. The other terminal of the battery is grounded to the shell 10 through a switch 44. One side of the lamp 27 is also grounded so that the closing of the switch 44 lights the lamp 27, thus causing light to be focused by the lens 41 onto the mirrors 33 to 36 inclusive and out through each of the four holes 37. A sensitized film 45 is mounted in the bore 12 and receives and records the impressions.

If the device is tilted as shown in Fig. 2, the pendulum supporting arrangement allows the pendulum to assume a vertical position. Fig. 6 most clearly shows the relationship of the beams of light at this time. Inasmuch as the pendulum is vertical and the shell 10 is not, it follows that the lower end of the pendulum, and consequently the mirrors, moves nearer to one side of the apparatus than the other. Due to this fact, and that the images are impinged on a cylindrical film, and that the light beams are always directed horizontally at ninety degrees to each other, the spots of light formed from the north and east mirrors 33 and 34 respectively are closer together than the images formed by the south and west mirrors 35 and 36 respectively. This is clearly shown in Fig. 6, and the result on the flattened film is shown in Fig. 7 where the numerals 46, 47, 48, and 49 represent the images cast by the mirrors 33 to 36 inclusive as determined by the transparent spot 50 in the image on the film as cast by the opaque spot 39 on the north mirror 33.

In the operation of my invention, the direction of the mirrors is accurately determined and the device is then placed into the position where the reading is to be taken, keeping the device at a known azimuth so that the direction of the north mirror 33, or of some other mirror is always known. The switch 44 is momentarily closed and the film developed.

Referring to Figs. 7 and 8, the method by which the direction and amount of inclination is computed will be explained. In these figures, the device is shown as being pointed in a southwesterly direction, as shown also in Fig. 6. Referring to Fig. 8, the values indicated are as follows:

$L$ = Effective length of pendulum
$R$ = Radius of light sensitive member
$D$—$D$ = Vertical plane of tilt
$C$ = Angle between plane of tilt and north direction
$A$ = Northerly component angle
$B$ = Easterly component angle Angle $A = \frac{x_1}{R} \times \frac{\pi}{180}$ degrees Angle $B = \frac{y_1}{R} \times \frac{\pi}{180}$ degrees $x = R \sin A$
$y = R \sin B$ Angle of inclination $= \sin^{-1} \sqrt{\frac{x^2+y^2}{L}} = \sin^{-1} \frac{z}{L}$ $C = \tan^{-1} \frac{x}{y}$ In the diagrams the cardinal points 55 may be found by locating one-half the circumferential distance between alternate images, that is, $$\frac{W-E}{2} \text{ and } \frac{N-S}{2}.$$

When these cardinal points are located, the circumferential distances $x_1$ and $y_1$ may be scaled off, thus giving the complete data by which to compute the angle of inclination and also the angle $C$.

By knowing the azimuth of the device, it is thus a simple matter to calculate the amount and direction of the slope.

I claim as my invention:

1. An inclination recording device comprising: a supporting structure; a light-sensitive cylindrical film carried by said supporting structure; a pendulum carried by said supporting structure, said pendulum carrying a plurality of mirrors adapted to reflect light rays outwardly onto said film; and means for defining the size of beam reflected from said mirrors.

2. An inclination recording device comprising: a supporting structure; a light-sensitive cylindrical film carried inside said supporting structure; a pendulum carried by said supporting structure and adapted to maintain a vertical position, a light source positioned near the upper end of said pendulum; and mirrors in said pendulum adapted to reflect the light from said source outward to impinge on said film.

3. An inclination recording device comprising: a supporting structure in which a cylindrical light-sensitive means is positioned; a pendulum of known azimuth having its lower end inside said cylindrical light-sensitive means; a light source positioned near the upper end of said pendulum, said source sending light rays downward through said pendulum; a plurality of mirrors in the lower portion of said pendulum and against which said rays impinge and are reflected onto said light-sensitive means; and means for determining the size of the beam of rays impinged on said light-sensitive means by said mirrors.

4. A combination as defined in claim 1 in which said mirrors are positioned at an angle of substantially forty-five degrees from the axis of said pendulum.

5. A combination as defined in claim 1 in which said mirrors are positioned at an angle of substantially forty-five degrees from the axis of said pendulum, and in which the rays reflected by said mirrors are in the same plane and substantially at right angles to each other.

6. In an inclination recording device, the combination of: a supporting structure holding a cylindrical light-sensitive member; a pendulum mounted with its free end movable inside said cylindrical light-sensitive member; and means for directing light rays outward from the free end of said pendulum onto said light-sensitive member and in a plane substantially at right angles to the axis of said pendulum.

7. In an inclination recording device the combination of: a supporting structure holding a cylindrical light-sensitive member; a pendulum mounted with its free end movable relative to said cylindrical light-sensitive member; and means for directing light rays outwardly from the free end of said pendulum in a direction to impinge on said light-sensitive member.

8. In combination with a light-sensitive member: a recording member movable relative to said light-sensitive member; means for directing a plurality of beams of light from said recording member in fixed directions toward said light-sensitive member, said beams impinging on said light-sensitive member and exposing said light-sensitive member in spots, the relative spacing of which is a function of the relative position of said light-sensitive member and said recording member.

9. A combination as defined in claim 8 in which said light-sensitive member is in cylindrical form and surrounds that portion of said recording member from which said beams of light extend.

10. In combination: a member adapted to maintain a vertical position, said member being positioned inside a light-sensitive member of cylindrical shape; a unitary light source; means for dividing the light from said light source into four beams lying in the same plane and of which the adjacent beams are at right angles to each other, and which beams are intersecting in said member, said beams impinging on said light-sensitive member; and means for controlling the illumination of said light source.

In testimony whereof, I have hereunto set my hand at Los Angeles, California, this 21st day of July, 1927.

ROBERT H. MILLER.